July 21, 1931.　　　J. E. BARRASS　　　1,815,041
HANDLE SWITCH
Filed Nov. 4, 1927
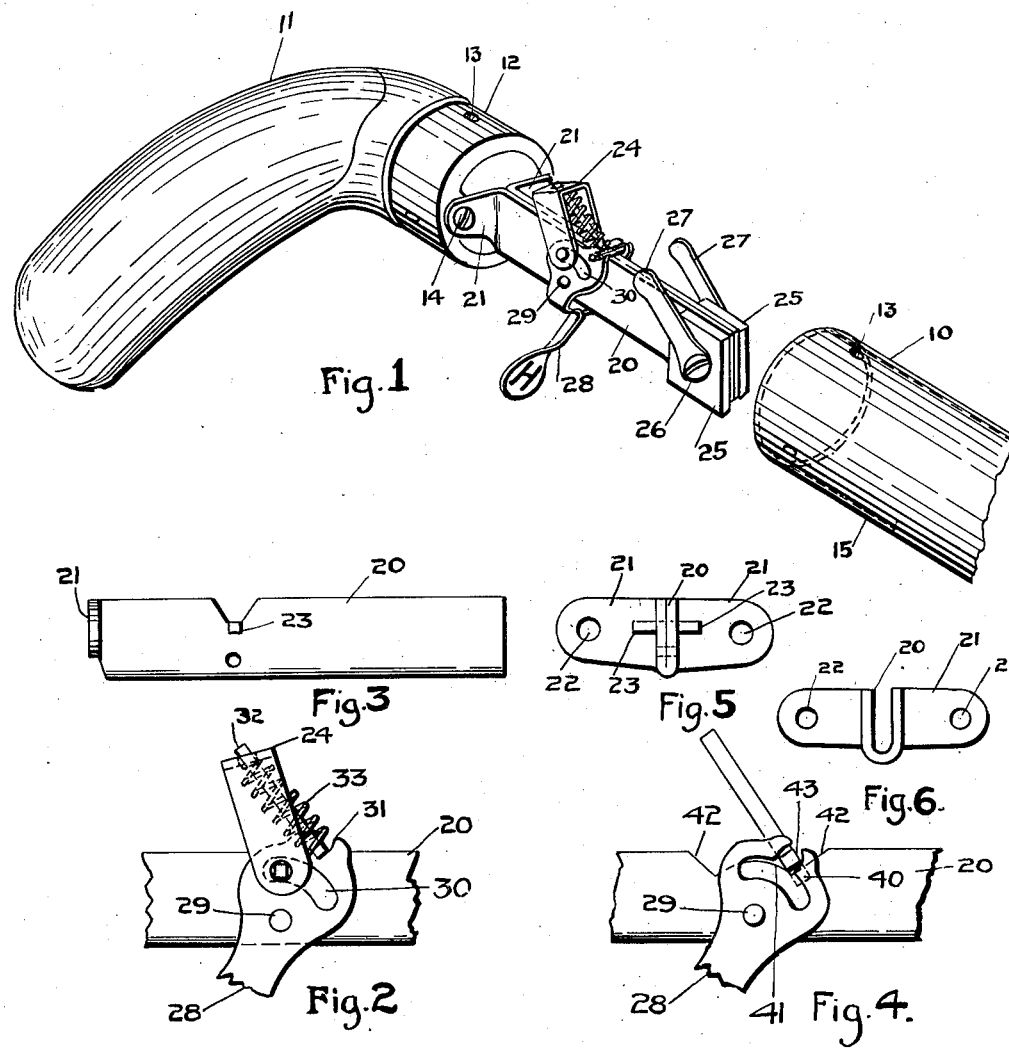
INVENTOR
Juddson E. Barrass
BY
*Harry E. Demaree*
ATTORNEY Patented July 21, 1931

1,815,041

UNITED STATES PATENT OFFICE

JUDDSON E. BARRASS, OF UNIONTOWN, OHIO, ASSIGNOR TO THE HOOVER COMPANY, A CORPORATION OF OHIO

HANDLE SWITCH

Application filed November 4, 1927. Serial No. 230,969.

This invention relates to handle switches, and particularly to switches for electric suction cleaners, electric floor polishers and similar electrically operated machines, that are propelled by means of a handle. It has been found advantageous to provide a propelling handle member having a particular relation with respect to the article propelled and to have an electric switch for controlling the machines conveniently placed in the handle so that it is readily accessible and easily operable.

The principal objects of the invention are to provide a handle for hand-propelled devices which is constructed and arranged in a particular manner so that the machine may be operated with the least amount of effort and fatigue; to provide an operating handle having a controlling switch arranged in close and convenient proximity to the grip portion of the handle; to provide a construction whereby the controlling switch is conveniently mounted for removal so that the original assemblage is simple and convenient, and to provide an improved switch structure for use in connection with such propelling handle.

Other and additional objects of the invention will become apparent on reading the specification, and from inspection of the drawings, in which;

Figure 1 shows the invention in perspective;

Fig. 2 is a fragmentary side elevation of the switch;

Fig. 3 is a side elevation of the switch frame shown in Fig. 2;

Fig. 4 is a fragmentary side elevation of a modified form of switch;

Fig. 5 is an end elevation of the switch frame shown in Fig. 3; and

Fig. 6 is an end elevation of the switch frame shown in Fig. 4.

In the drawings a tubular handle member 10 is shown, which is appropriately secured at its lower end to a tool to be propelled. A curved handle grip member 11, of the type ordinarily referred to as a pistol-grip, forms a convenient part which may be held in the hand so that when the handle is in the normal position for operating the machine the hand of the operator is in a normal and natural position. By employing a handle grip member, as stated, there is much less fatigue from the operation of the machine, and the machine in general, is easier to handle.

One end of the grip portion 11 is slightly reduced in diameter at 12 in order that it may enter the tubular handle portion 10. The tubular handle and handle grip portion are held in proper relation by means of screws or other appropriate fastening members inserted in the holes 13 which are so located in the handle portion and grip portion that when these parts are assembled they are in alinement and permit the entry of securing means.

On the end face of the reduced portion 12 of the grip there are provided holes for the reception of screws 14, only one of which is shown, but the other is diametrically opposite the one illustrated. These screws are provided for the purpose of holding a switch assemblage in proper relation to the grip portion 11. In the tubular portion 10 of the handle there is provided a slot 15 to receive the operating trigger of the electric switch which is secured to the grip portion 11 when the grip portion and the tubular handle portion are assembled in proper relation.

The electric switch comprises a main frame portion 20 which is formed of a flat sheet bent over upon itself as shown in Fig. 5 in order that the requisite stiffness may be obtained and yet provide a portion which may be turned outwardly at right angles to form ears 21 for mounting the switch. Each of these ears has a hole 22 formed therein through which screws 14 are inserted for securing the switch to the handle-grip portion 11. In forming the main frame member the folded blank from which it may be made is cut inwardly at one end a distance to permit the bending of the divided portions which are turned out at right angles to provide the mounting ears 21. Portions of the frame are struck out in order to form studs 23 on which the contact yoke 24 is mounted.

At the outer end of main switch frame 20 there are secured insulating blocks 25 on which are mounted the switch terminals 26, one of which is not shown, and extending from the switch terminals 26 there are mounted contact members 27.

The operating mechanism for this switch comprises an operating trigger 28 pivoted at 29 and having formed therein an arcuate slot 30, the slot 30 being so positioned that as the trigger 28 is oscillated the slot will freely pass the stud 23.

In the upper portion of the operating trigger there is provided a substantially U-shaped slot 31 in which the T head of the operating plunger 32 rides. On the stem portion of plunger 32 there is mounted a compression spring 33, one end of which abuts the T head of the plunger while the other end abuts the cross member of the contact yoke 24 around an opening therein through which the stem portion of plunger 32 freely slides.

The contact yoke 24 is provided at its lower end with openings adapted to be mounted on the studs 23 which also function as limiting stops for the oscillating operating trigger 28 by contacting the ends of arcuate slots 30.

The general method of operation of an electrical switch of the present type being well known to those skilled in the art, it is believed to be unnecessary to give a detailed description thereof other than to call attention to the fact that the studs or limiting lugs 23 serve a double function in that they support the oscillating contact yoke 24 and also serve, in cooperation with the arcuate slots 30, to limit the movement of the operating trigger 28.

In Figs. 4 and 6 there is shown a modification of the switch construction wherein, when the main frame 20 is folded, it is not folded tight against itself, but is formed in a substantial U-shape with an appreciable space left between the two side members. This construction just described is used in conjunction with an operating plunger which has a head in the form of a cross rather than a T as described in connection with Fig. 2, and in which a fourth leg 40 thereof is adapted to extend down into the space between the legs or sides of the U-shaped main frame in order that the travel of the plunger may be guided.

In this modification of the structure the main frame has a portion on each side 41 which is cut to an arcuate shape and at the ends of which are formed abutments 42, members 43 of the plunger head ride on these arcuately cut portions and, at the end of their travel in either direction, are limited by the stops 42. The studs 23 are not provided in this modified structure as the contact yoke is directly mounted on the pivot pin 29. The operation of this switch is the same as the one previously described.

While the main frame portion 20 of the switch construction has been mentioned as comprising a single piece folded upon itself, it will of course be understood that it might readily be constructed of two separate pieces of metal secured together by welding, riveting or by any other appropriate means.

In connection with a propelling handle such as has been described wherein there is employed a separate handle grip member secured thereto, a switch having a main frame construction substantially as that described has a number of features which are very advantageous. By providing a rigid main frame having the mounting at one end, it is possible to secure the main frame to the face of the grip portion, as by screws 14, which feature, in conjunction with other conveniences and advantages, makes such a construction valuable as regards the matter of assembly.

The switch may be assembled as a unit and, with a conductor cord attached thereto, may be maintained as a unit for final assemblage or, the switch may be attached to the grip member 11 by screws 14 and this assemblage held as a unit for final assemblage into the handle portion 10.

It has been found that the matter of unit assemblages is very important in assembling complete machines, and that there is every advantage to be gained by having various parts of a machine assembled into assembly units whereby the final assemblage requires only the bringing together of several sub-assemblages, rather than a detailed assemblage of the machine from its various component parts.

Changes may be made in the form, construction and arrangement of the parts without departing from the spirit of the invention or sacrificing any of the advantages thereof and the right is reserved to make all such changes as fairly fall within the scope of the following claims.

I claim:—

1. A handle for hand propelled tools comprising a main tubular portion, a grip portion and a circuit making device mounted on the base of the grip portion and housed in the tubular portion.

2. A tool-propelling handle comprising a grip portion, a circuit making device mounted on the base of the grip and extending therefrom, a main tubular handle portion to receive the circuit making device, and means for securing the main handle portion and grip portion together.

3. A tool-propelling handle comprising a main handle member and a grip member, an electric switch secured at one end to the base of the grip portion, the switch having an operating lever, an end of the main handle member being made tubular and having a relatively long narrow slot to receive the switch-operating lever, the handle-grip switch assemblage being mountable in the main handle member as a unit.

4. The combination of a handle comprising a tubular portion, and a grip portion having a part thereof which telescopes with said tubular portion, of an electric switch having an operating lever mounted on the end of said grip portion and received in the tubular portion when said end of said grip portion is telescoped therein, and means for securing the grip to the tubular portion, said tubular portion having a slot to receive the operating lever of said switch.

5. In a suction sweeper, a handle comprising a tubular portion and a grip portion detachably connected to said tubular portion, a reduced portion on said grip portion received in said tubular portion, an electric switch having an operating lever mounted on the end of said reduced portion and arranged in said tubular portion, said latter portion having a slot to receive the switch lever, and means for securing the grip and tubular portions together.

6. The combination of a handle comprising a tubular portion having a slot and a grip portion having a part thereof which telescopes with said tubular portion, of an electric switch comprising a supporting frame mounted on said grip portion and an operating lever carried thereby at a distance from said grip portion, characterized by the fact that said switch is housed within said handle with the lever extending therethrough at said slot and movable in the direction of the length thereof.

Signed at Uniontown, in the county of Stark, and State of Ohio, this 24th day of October, A. D. 1927.

JUDDSON E. BARRASS.